United States Patent [19]
Kihara

[11] Patent Number: 4,876,599
[45] Date of Patent: Oct. 24, 1989

[54] APERTURE CORRECTION CIRCUIT

[75] Inventor: Taku Kihara, Kanagawa, Japan

[73] Assignee: Sony Corp., Tokyo, Japan

[21] Appl. No.: 323,401

[22] Filed: Mar. 14, 1988

Related U.S. Application Data
[62] Division of Ser. No. 171,764, Mar. 22, 1988.

[30] Foreign Application Priority Data

Mar. 31, 1987 [JP] Japan ................................ 62-080310

[51] Int. Cl.⁴ ............................................. H04N 5/14
[52] U.S. Cl. ....................................... 358/162; 358/37
[58] Field of Search ................... 358/166, 162, 96, 37

[56] References Cited
U.S. PATENT DOCUMENTS
4,499,486 2/1985 Faureau et al. ...................... 358/166

OTHER PUBLICATIONS
Oliphant et al., "A Telecine Processing Channel", SMPTE Journal, 7/79, vol. 88, No. 7, pp. 474–480.

Primary Examiner—Edward L. Coles, Sr.
Assistant Examiner—David E. Harvey
Attorney, Agent, or Firm—Alvin Sinderbrand

[57] ABSTRACT

An aperture correction circuit adds to the input video signal an aperture correction signal formed from the input video signal and which is subject to non-linear processing to thereby effect the aperture correction for a picture of low or high contrast.

3 Claims, 6 Drawing Sheets

APERTURE CORRECTION CIRCUIT

This application is a division of application Ser. No. 171,764, filed Mar. 22, 1988.

BACKGROUND OF THE INVENTION

1. Field of the Invention

The present invention relates generally to aperture correction circuits in which an aperture correction signal formed from an input video signal is added to the input video signal and then generated as an output signal. More particularly, this invention relates to an aperture correction circuit for use with video apparatus such as a video camera or the like.

2. Description of the Prior Art

In a video apparatus such as a video camera and the like, a transversal filter, a band-pass filter or the like is employed to form an aperture correction signal from an input video signal so as to emphasize the outline of a picture. Then, this aperture correction signal is added to the input video signal to increase the resolution of a picture.

In the prior art, various signal processings such as an aperture correction and the like for a video signal are carried out in the form of an analog video signal in an analog signal processing system or in the form of a digitized video signal in a digital signal processing system.

In the conventional aperture correction circuit, an aperture correction signal linearly proportional to the signal level of the input video signal is generated by the transversal filter, band-pass filter or the like, and the aperture correction is performed by the analog signal processing system or the digital signal processing system that effect the linear operation. As a result, the amount of correction is small at the portion of the picture having low contrast so that the aperture correction effect, such as the emphasized sharpness of the picture and the improved apparent contrast of the picture, cannot be achieved satisfactorily. Further, the aperture correction amount is too large at the portion of the picture having high contrast so that the picture looks unnatural. Particularly, when the video signal is digitized and the aperture correction processing is performed by the digital signal processing system, the amount of the aperture correction is noticeably insufficient at the portion of the picture having low contrast or the amount of the aperture correction is remarkably large at the portion of the picture having high contrast.

OBJECTS AND SUMMARY OF THE INVENTION

Accordingly, it is an object of the present invention to provide an improved aperture correction circuit which can remove the defects encountered with the prior art.

It is another object of the present invention to provide an aperture correction circuit in which an aperture correction signal is subject to non-linear processing and then added to an input video signal to thereby perform a natural appearing aperture correction on the picture portions of low and high contrast.

It is a further object of the present invention to provide an aperture correction circuit which can properly determine control parameters used to generate an aperture correction signal in accordance with image pick-up conditions that are changed in a wide variety of ways.

According to an aspect of the present invention, there is provided an aperture correction circuit comprising:
a video signal source for generating a video signal;
aperture correction signal generating means supplied with the video signal from said video signal source for generating an aperture correction signal;
absolute value generating means supplied with said aperture correction signal for generating an absolute value and a sign signal thereof;
level detecting means supplied with said absolute value for generating a detected output;
coefficient signal generating means controlled by said detected output for generating at least one coefficient signal;
operating means for operating said absolute value and said coefficient signal generating means such that the output gain relative to the input becomes smaller as the absolute value becomes larger;
combining means for combining the output of said operating means and said sign signal; and
adding means for adding the output of said combining means and said video signal.

The above, and other objects, features and advantages of the present invention, will become apparent from the following detailed description of the preferred embodiments which is to be read in conjunction with the accompanying drawings, and throughout which like reference numerals identify the same or similar parts.

DETAILED DESCRIPTION OF THE PREFERRED EMBODIMENTS

Prior to explaining the embodiments of the present invention, a practical circuit arrangement of a signal processing circuit of a tri-tube color video camera to which the present invention is advantageously applied will be described hereinafter with reference to FIG. 1.

Figure 1:
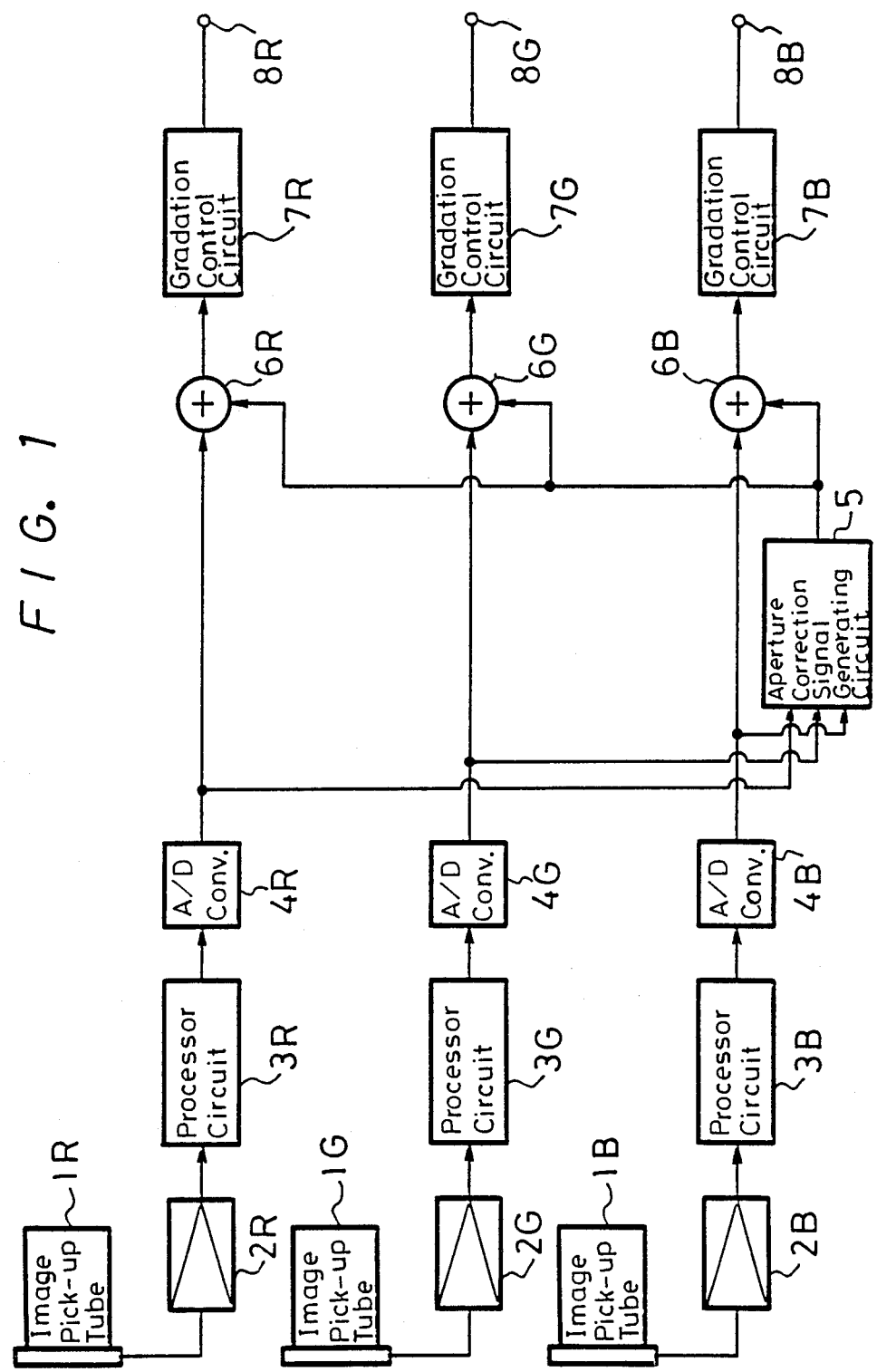
FIG. 1 is a block diagram showing an overall arrangement of a tri-tube color video camera to which the present invention is applied.

As shown in FIG. 1, there are provided red, green and blue image pick-up tubes 1R, 1G and 1B, respectively. Lights of the three primary colors travel from an image in the field of view of the camera through an optical system (not shown) such as a lens, a color separation prism or the like and are respectively introduced into the three image pick-up tubes 1R, 1G and 1B which then derive three primary color signals with magnitudes corresponding to the amounts of light incident thereon. Amplifying circuits 2R, 2G and 2B are provided to amplify the three primary color signals from the three image pick-up tubes 1R, 1G and 1B, respectively. Further, there are shown processor circuits 3R, 3G and 3B that effect predetermined signal processings such as gamma-correction, white clip and the like on the outputs from the amplifying circuits 2R, 2G and 2B, respectively. A/D (analog-to-digital) converters 4R, 4G and 4B are provided to convert the thus processed three primary color signals from analog signals to digital signals, respectively. An aperture correction signal generating circuit 5 is provided to receive the three primary color signals digitized by the respective A/D converters 4R, 4G and 4B and generates an aperture correction signal on the basis of a predetermined one of these digital signals. The aperture correction signal from the aperture correction signal generating circuit 5 is supplied to adders 6R, 6G and 6B in which it is added to the respective digital primary color signals derived from the A/D converters 4R, 4G and 4B. Then, the resulting aperture-corrected primary color signals are supplied to gradation control circuits 7R, 7G and 7B ; respectively, that are used to change the gradation of a dark portion of a picked-up image. The output signals from the gradation control circuits 7R, 7G and 7B are delivered to output terminals 8R, 8G and 8B, respectively. If necessary, the output signals developed at the respective output terminals 8R, 8G and 8B are converted into analog signals by D/A (digital-to-analog) converters (not shown) and then fed to a color encoder (not shown) that produces a composite color video signal. If a digital color encoder is used, the signals at the output terminals 8R, 8G and 8B can be directly supplied to the digital color encoder which then derives a digital composite color video signal.

Figure 2:
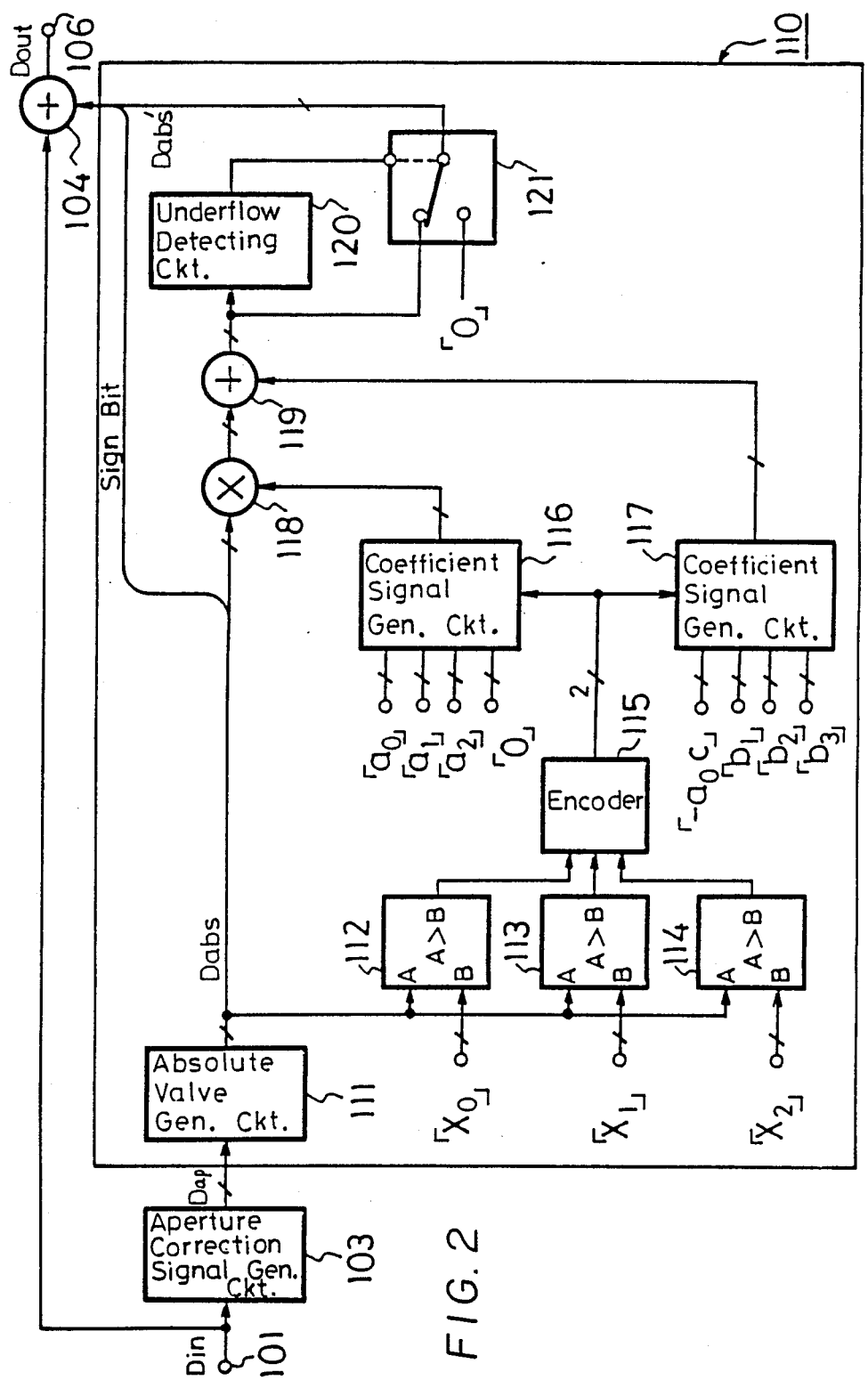
FIG. 2 is a block diagram showing an embodiment of an aperture correction circuit according to the present invention.

FIG. 2 illustrates an embodiment of the aperture correction circuit according to this invention, and in which an incoming video signal $D_{in}$ is applied to a signal input terminal 101. his incoming video signal Din results from selecting or mixing the output signals of the A/D converters 4R, 4G and 4B shown in FIG. 1 in accordance with respective image pick-up conditions. The digital video signal Din is then supplied to an aperture correction signal generating circuit 103 and a signal adding circuit 104. The above-mentioned aperture correction signal generating circuit 103 is adapted to extract video data Dap representing the outline portion of the picked-up picture from the digital video signal Din and to supply aperture correction data Dap with 2's complementary code representing the signal level of the aperture correction signal to an absolute value generating circuit 111 which forms a part of a non-linear processing circuit 110.

Figure 3:
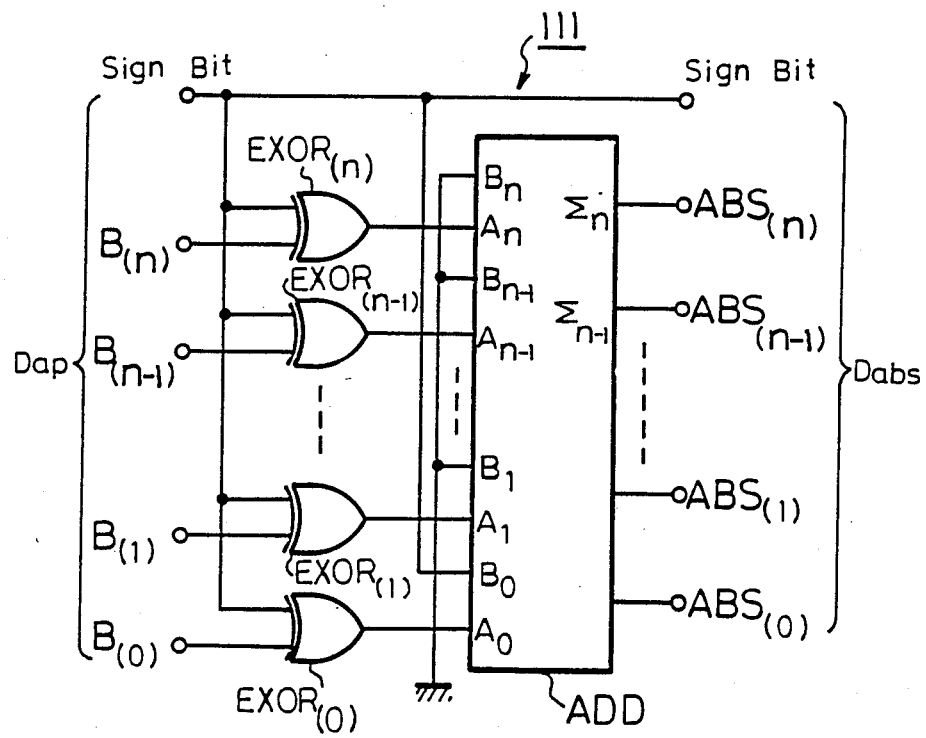
FIG. 3 is a block diagram showing a practical circuit arrangement of an absolute value generating circuit which is included in the aperture correction circuit shown in FIG. 2.

FIG. 3 shows a practical circuit arrangement of the absolute value generating circuit 111 which is shown to be formed of (n+1) exclusive-OR circuits $EXOR_{(0)}$, $EXOR_{(1)}$ ... $EXOR_{(n-1)}$, $EXOR_{(n)}$ of which the number (n) is equal to the bit number of the above-mentioned aperture correction data Dap and a single adding circuit ADD. The above-mentioned exclusive-OR circuits $EXOR_{(0)}$, $EXOR_{(1)}$ ... $EXOR_{(n-1)}$, $EXOR_{(n)}$ are adapted to supply to the adding circuit ADD the exclusive-OR outputs of respective bits $B_{(0)}$, $B_{(1)}$ ... $B_{(n-1)}$, $B_{(n)}$ of the above aperture correction data Dap and a sign signal SIGN BIT.

The above-mentioned adding circuit ADD is adapted to add the least significant bit (LSB) of the value represented by the exclusive-OR outputs from the above-mentioned exclusive-OR circuits $EXOR_{(0)}$, $EXOR_{(1)}$ ... $EXOR_{(n-1)}$, $EXOR_{(n)}$ with logic "1" or logic "0" represented by the sign signal Sign Bit to convert the signal level of the above aperture correction data or 2's complementary code aperture correction data Dap into absolute value aperture correction data Dabs which are represented by the sign signal Sign Bit and the absolute data $ABS_{(0)}$, $ABS_{(1)}$ ... $ABS_{(n-1)}$, $ABS_{(n)}$.

Turning back to FIG. 2, the absolute data $ABS_{(0)}$, $ABS_{(1)}$ ... $ABS_{(n-1)}$, $ABS_{(n)}$ of the absolute value aperture correction data Dabs with sign signal SIGN BIT derived from the absolute value generating circuit 111 are supplied to three comparing circuits 112, 113, and 114 and to a multiplying circuit 118, while the above mentioned sign signal SIGN BIT is also supplied to the adding circuit 104.

The above-mentioned comparing circuits 112, 113 and 114 are respectively supplied with comparing data "$x_0$", "$x_1$" and "$x_2$" of different values and compare such comparing data "$x_0$", "$x_1$" and "$x_2$" with a value "x" which is represented by the above-mentioned absolute data $ABS_{(0)}$, $ABS_{(1)}$ ... $ABS_{(n-1)}$, $ABS_{(n)}$. In the embodiment being described,, the comparing data "$x_0$", "$x_1$" and "$x_2$ are set to satisfy the condition, $0 < x_0 < x_1 < x_2$.

The compared outputs from the comparing circuits 112, 113 and 114 are supplied to an encoder 115. The encoder 115 generates, from the compared outputs of the comparing circuits 112, 113 and 114, control data of 2 bits indicating in which range of the following inequalities the value "x" represented by the above-mentioned absolute data $ABS_{(0)}$, $ABS_{(1)}$ ... $ABS_{(n-1)}$, $ABS_{(n)}$ is situated;.

A—$0 < x < x_0$
B—$x_0 < x < x_1$
C—$x_1 < x < x_2$
D—$x_2 < x$

The 2-bit control data from the encoder 115 are supplied to two coefficient signal generating circuits 116 and 117.

The first coefficient signal generating circuit 116, has supplied thereto four coefficients "$a_0$", "$a_1$", "$a_2$" and "0" as primary (gain) coefficient of an input/output function f(x) for the non-linear processing circuit 110. Then, the first coefficient signal generating circuit 116 responds to the 2-bit control data from the encoder 115 to select the four coefficients "$a_0$", "$a_1$", "$a_2$" and "0" in response to the ranges A to D represented by the absolute value data $ABS_{(0)}$, $ABS_{(1)}$ ... $ABS_{(n-1)}$, $ABS_{(n)}$ as follows.

A—$0 < x < x_0$: $a_0$
B—$x_0 < x < x_1$: $a_1$
C—$x_1 < x < x_2$: $a_2$
D—$x_2 < x$: 0

The coefficient signal generating circuit 116 supplies the one selected coefficient to the multiplying circuit 118. The multiplying circuit 118 multiples the value "x" represented by the absolute value data $ABS_{(0)}$, $ABS_{(1)}$ ... $ABS_{(n-1)}$, $ABS_{(n)}$ from the absolute value generating circuit 111 by the one of the coefficients "$a_0$", "$a_1$", "$a_2$" and "0" that is selectively supplied from the first coefficient signal generating circuit 116. The multiplying circuit 118 then supplies its multiplied output to an adding circuit 119.

Meanwhile, the second coefficient signal generating circuit 117 receives four coefficients "$-a_0c$", "$b_1$", "$b_2$" and "$b_3$" as a zero-order (offset) coefficient of the input-/output function f(x) of the non-linear processing circuit 110. The second coefficient signal generating circuit 117 responds to the 2-bit control data supplied from the encoder 115 to select the four coefficients "$-a_0c$", "$b_1$" "$b_2$" and "$b_3$" in response to the range A to D represented by the value "x" of the absolute value data $ABS_{(0)}$, $ABS_{(1)}$ ... $ABS_{(n-1)}$, $ABS_{(n)}$ as follows:

A—$0 < x < x_0$: $-a_0c$
B—$x_0 < x < x_1$: $b_1$
C—$x_1 < x < x_2$: $b_2$
D—$X_2 < x$: $b_3$

Then, the second coefficient signal generating crcuit 117 selects and supplies one of the foregoing coefficients to the adding circuit 119. The adding circuit 119 adds the selected one of the four coefficients "$-a_0c$", "$b_1$", "$b_2$" and "$b_3$" supplied from the above-mentioned second coefficient signal generating circuit 117 to the multiplied output from the multiplying circuit 118 and supplies the added output to an underflow detecting circuit 120. The adding circuit 119 also supplies the added output through a switching circuit 121 to the adding circuit 104. The underflow detecting circuit 120 detects when the output of the adding circuit 119 goes to a negative value and, in that case, control the switching circuit 121 to change its position from that shown on FIG. 2 and in which the output of the adding circuit 119 is applied to the adding circuit 104. The above-mentioned switching circuit 121 is supplied with a constant "0" at another input terminal thereof. When the value "x" represented by the absolute value data, $ABS_{(0)}$, $ABS_{(1)}$ ... $ABS_{(n-1)}$, $ABS_{(n)}$ falls within the range of $0 < x < c$, or the underflow detecting circuit 120 detects that the added result from the adding circuit 119 is a negative value, the switching circuit 121 is changed-over and selects the above-mentioned constant "0". On the other hand, when the value "x" lies in other ranges, the switching circuit 121 selects the added output derived from the adding circuit 119.

The above-mentioned non-linear processing circuit 110 gives a non-linear characteristic $f(x)$ to the absolute value data $ABS_{(0)}$, $ABS_{(1)}$ ... $ABS_{(n-1)}$, $ABS_{(n)}$ of the aperture correction data Dabs represented by the absolute value from the absolute value signal generating circuit 111 with respect to the aperture correction data Dap formed by the aperture correction signal generating circuit 103. Such non-linear characterstic $f(x)$ changes in the following ranges of the value "x" by the operations of the multiplying circuit 118, the adding circuit 119 and the switching circuit 121.

Figure 4:
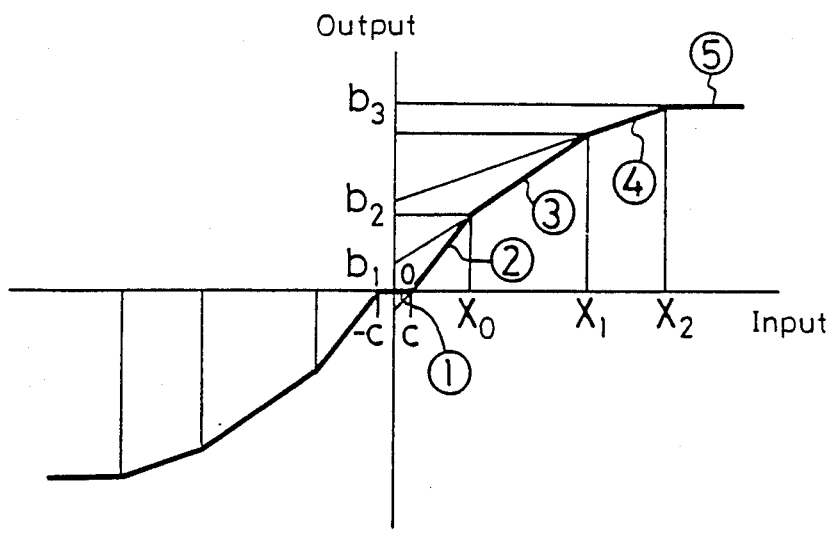
FIG. 4 is a graphical representation of an input/output characteristic used to explain the operation of the embodiment of the invention shown in FIG. 2.

A' in the range of $0 < x < c$, $f(x) = 0$
A" in the range of $c < x < x_0$, $f(x) = a_0(x-c)$
B in the range of $x_0 < x < x_1$, $f(x) = a1^{x+b_1}$
C in the range of $x_1 < x < s_2$, $f(x) = a_2x + b_2$
D in the range of $x_2 < x$, $f(x) = b_3$ The non-linear processing circuit 110 also adds the sign signal SIGN BIT to the processed data to effect non-linear processing having the input and output characteristic shown in a graphical representation on FIG. 4. In other words, the non-linear processing circuit 110 performs the non-linear processing such that the input/output gain becomes smaller with increases in the value "x" of the absolute value data $ABS_{(0)}$, $ABS_{(1)}$ ... $ABS_{(n-1)}$, $ABS_{(n)}$ of the aperture correction data Dabs.

The adding circuit 104 which receives aperture correction data Dabs' processed by the above-mentioned non-linear processing circuit 110 adds the input video data Din with the above-mentioned aperture correction data Dabs' to form aperture-corrected video data Dout.

The video data Dout derived from the adding circuit 104 is delivered through a signal output terminal 106.

According to this embodiment, as described above, the aperture correction signal formed from the input video signal is processed by the above-mentioned non-linear processing circuit 110 in such a fashion that the input/output gain becomes smaller as the absolute value "x" of the signal level becomes larger. Thus, the low contrast portion of the picked-up picture can appear to become sharper and the apparent contrast thereof can be improved by increasing the amount of the aperture correction. At the same time, the high contrast portion of the picked-up picture can be aperture-corrected to look natural by decreasing the amount of the aperture correction. Further, in accordance with this embodiment, since the aperture correction signal in the range A' of $0 < x < c$ in which the absolute value data $ABS_{(0)}$, $ABS_{(1)}$ ... $ABS_{(n-1)}$, $ABS_{(n)}$ of the aperture correction data Dabs is very small is regarded as a noise so as to establish $f(x) = 0$ and the aperture correction signal is clipped to the level zero, it is possible to suppress deterioration of the quality of picture by the noise.

When the aperture correction signal is being generated from the output signals from one or more of the A/D converters 4R, 4G and 4B shown in FIG. 1, , the green signal G having the highest resolution is generally employed or the luminance signal is generated from the three primary color signals R, G and B and then the aperture correction signal is generated on the basis of the thus formed luminance signal. When the background of the picture is changed from one to another of various colors, however, it is difficult to perform satisfactory aperture correction of the picture. For example, when an underwater object is picked up, the background is bluish so that a swimming object such as fishes or the like in the sea cannot appear to be sharply defined . Therefore, it is necessary to properly select the signal from which the aperture correction signal is generated in accordance with the image pick-up conditions. Further, in response to the image pick-up conditions which change in a wide variety of ways, such as when the stage lighting is changed, the setting sun is changed outdoors or indoors and an underwater object is picked up, it is necessary to change various control parameters such as a crispening level Lc of the input/output characteristic, an amplitude limiting level Le, and the gain, boost frequency and the like.

Figure 5:
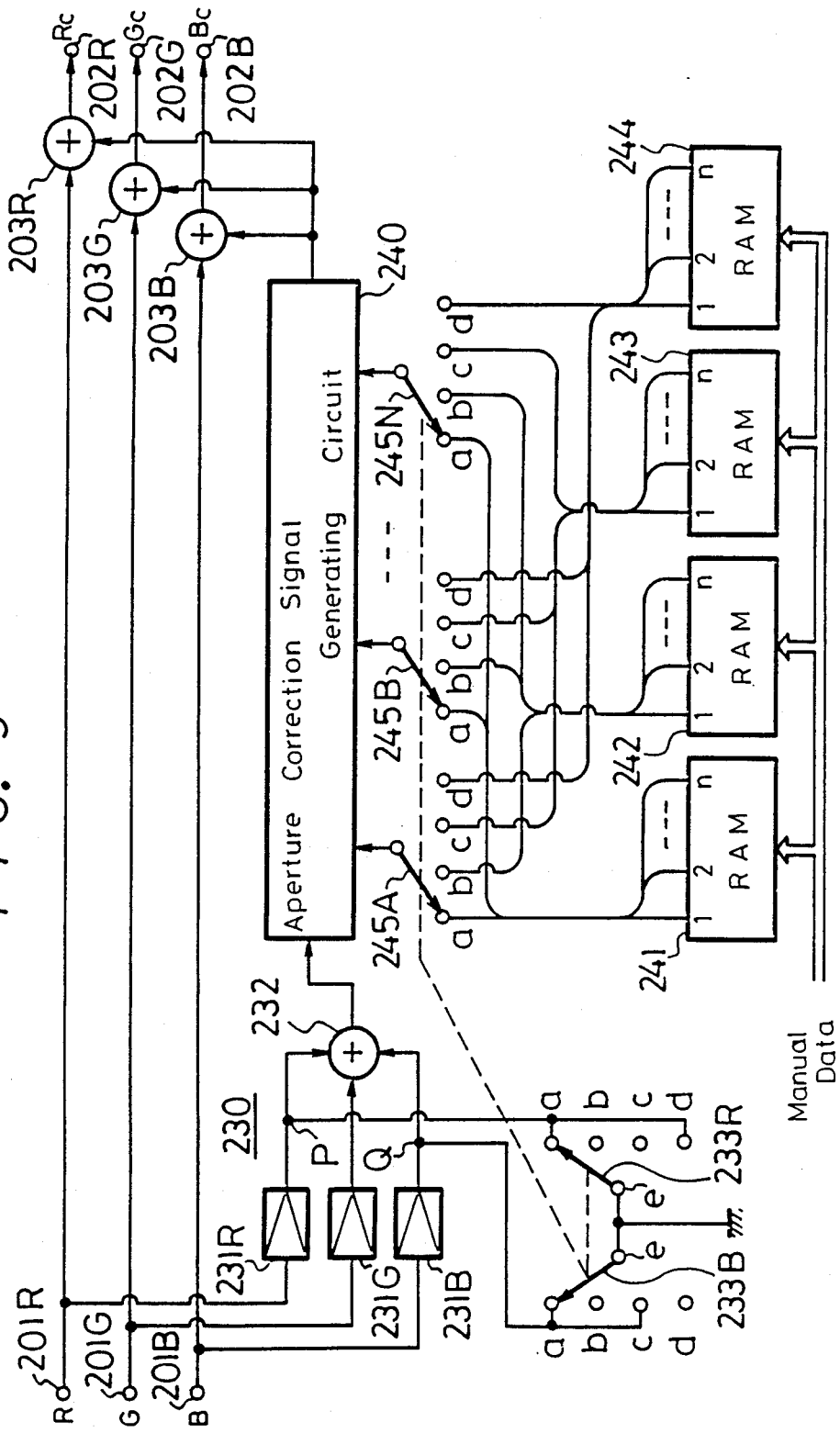
FIG. 5 is a block diagram showing another embodiment of the aperture correction circuit according to the present invention.

FIG. 5 shows another embodiment of the aperture correction circuit according to the present invention in which the red, green and blue digital output signals from the A/D converters 4R, 4G and 4B shown in FIG. 1 are properly selected in accordance with the image pick-up conditions to produce a composite digital color video signal. When the aperture correction signal is generated on the basis of this composite digital color video signal, various parameters are varied in association with the above-mentioned selection so that the optimum aperture correction can be effected.

More specifically, in FIG. 5, three primary color video signals R, G and B applied to input terminals 201R, 201G and 201B, i.e., the digital output signals from the A/D converters 4R, 4G and 4B in FIG. 1 are respectively supplied to adders 203R, 203G and 203B (corresponding to the adders 6R, 6G and 6B in FIG. 1) and buffer amplifiers 231R, 231G and 231B in a matrix circuit 230. Then, the outputs from these buffer amplifiers 231R, 231G and 231B are supplied to an adder 232.

A junction P between the buffer amplifier 231R and the adder 232 is connected to first and fourth fixed contacts a and d of a 4-contact change-over switch 233R, while a junction Q between the buffer amplifier 231B and the adder 232 is connected to first and third fixed contacts a and c of a 4-contact change-over switch 233B. Movable contacts e of the change-over switches 233R and 233B are both grounded.

An aperture correction signal generating circuit 240 is provided to receive the output from the adder 232 in the matrix circuit 230. The aperture correction signal from the aperture correction signal generating circuit 240 is supplied to adders 203R, 203G and 203B, and three aperture-corrected primary color video signals Rc, Gc and Bc are delivered from the adders 203R, 203G and 203B to output terminals 202R, 202G and 202B, respectively.

RAMS(random access memories) 241 to 244 are provided to store control parameters of n control items at every image pick-up mode.

The n outputs from the RAM 241 are supplied to the respective first fixed contacts a of n 4-contact change-over switches 245A, 245B, 245C . . . 245N, the n outputs from the RAM 242 are supplied to respective second fixed contacts b of the 4-contact change-over switches 245A to 245N, the n outputs from the RAM 243 are supplied to respective third fixed contacts c of the 4-contact change-over switches 245A to 245N, and the n outputs from the RAM 244 are supplied to respective fourth fixed contacts d of the 4-contact change-over switches 245A to 245N.

The n switches 245A to 245N are changed in position in association or ganged relation with the change-over switches 233B and 233R. The outputs from the respective switches 245A to 245N are supplied to the aperture correction signal generating circuit 240 by which the conditions of its adjusting circuits for the respective control items are controlled.

The operation of this embodiment will now be described for four image pick-up conditions noted on the following table 1 and the respective image pick-up conditions are assigned to the first to fourth connection states of the switches 233B, 233R and 245A to 245N, respectively.

It is relatively rare that the standard object has a high chroma saturation, and, therefore, in most cases, the switches are in the position a and the green signal G is in proportion to the brightness.

In the case where the object in the field of view of the camera is, for example, a singer wearing a costume having a high chroma saturation and the stage lighting of red, blue and the like is very frequency changed, as in a popular song program or the like, the switches are in the position b so that all the three primary color signals R, G and B are used to extract the aperture correction signal component, whereby it is possible to obtain the aperture correction for the pleats, pattern or the like of red and blue costumes.

In the third and fourth image pick-up conditions, the aperture correction using only the green signal G is not sufficient and thence, the aperture correction is effected on the basis of the green signal G, with the help of the red and blue color signals R and B, respectively.

TABLE 1

| connected position of switch | image pick-up conditions | output color signals from matrix circuit |
|---|---|---|
| a | standard | G |
| b | popular song program, etc. | R + G + B |
| c | the setting sun, red stage lighting | R + G |
| d | underwater, blue stage lighting | G + B |

In accordance with the above-mentioned image pick-up conditions, the respective control parameters for the aperture correction signal generating circuit 240 are determined as on the following table 2.

TABLE 2

| connected position of switch | crispening level | limit level | gain | boost frequency |
|---|---|---|---|---|
| a | low | middle | middle | low high |
| b | middle | high | high | middle |
| c | middle | low | high | low |
| d | high | low | high | low |

Since the green signal G used in the first image pick-up condition is comparatively high in S/N (signal-to-noise) ratio and the noise is rarely emphasized by the aperture correction, the crispening level is determined low. Further, the boost frequency is properly made low for the first image pick-up condition in accordance with the size of the object. for the third and fourth image pick-up conditions, the intensity of illumination of the object is generally low and the respective primary color signals R, G and B are low in S/N ratio. In this case, since the gain of the camera itself is frequently made high, the noise level of each of the primary color signals becomes high and the crispening level is made rather high. Since most of the pictures in the third and fourth image pick-up conditions have a small difference in brightness, the limit level of the aperture correction signal extracted from a portion of the picture having a certain difference of brightness is made low to thereby restrict the amplitude thereof. In the case of the aperture correction signal extracted from the picture at its portion having a small difference of brightness, the gain is also made high and hence the aperture correction effect is increased. In this case, the boost frequency is made low so as to prevent deterioration of the S/N ratio In this embodiment, while the image pick-up conditions noted on the table 1 are applied one after the other, and an object suitable for adjusting the circuit 240 is picked-up, for example, a test chart (not shown) formed of a plurality of vertical strip patterns to produce a multi-burst with a frequency of 1.0 mHz signal generating circuit 240 is picked-up, the respective the various adjusting circuits in the aperture correction signal generating circuit 240 are manually adjusted so as to effect a proper aperture correction. Thereafter, the values of the respective control parameters are written in the first to fourth memories (RAMs) 241 to 244 at every image pick-up condition.

When an object is picked up in practice, the switches 233B, 233R and the switches 245A to 245N are changed in position in association with one another in accordance with the image pick-up condition at that time and a set of suitable control parameters are read out from one of four memories (RAMs) 241 to 244 provided as the control parameter files, whereby the adjusting condition of the aperture correction signal generating circuit 240 can be immediately changed.

While the switches 245A to 245N are all associated or ganged with the switches 233B and 233R in the above embodiment, it may be possible to provide any one or more of the switches 245A to 245N in ganged relation with the switches 233B and 233R.

In the above embodiment of the present invention described in detail with reference to FIG. 5, since the combination of the respective primary color signals for producing the aperture correction signal component is switched in response to the respective image pick-up conditions and the proper values of various control parameters previously stored in the memories are read out to switch the adjusting conditions of the circuits for generating the aperture correction signal component, it is possible to effect the proper aperture correction immediately upon any change of the image pick-up conditions.

A practical example of the gradation control circuits 7R, 7G and 7B in FIG. 1 will be described with reference to FIGS. 6 to 8.

Figure 6:
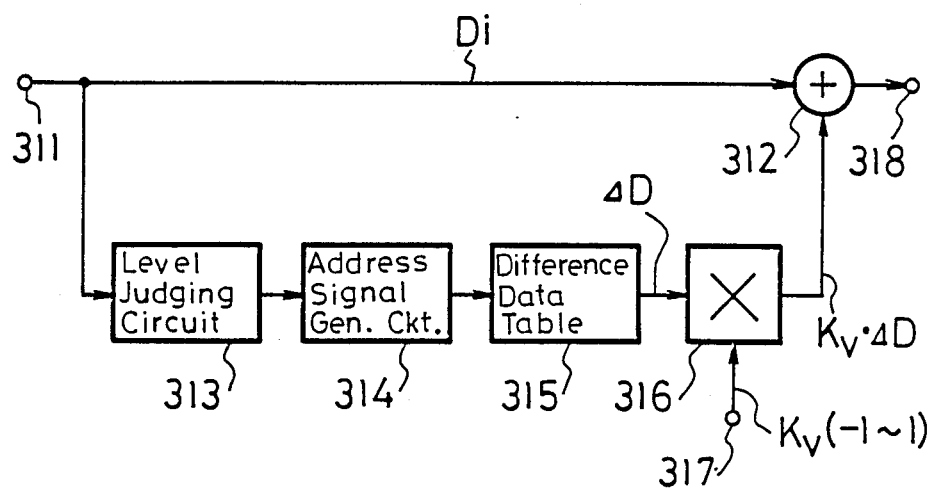
FIG. 6 is a block diagram showing a practical circuit arrangement of a gradation control circuit included in the color video camera shown in FIG. 1.

In FIG. 6, each of the aperture-corrected primary color signals Di is applied through an input terminal 311 to an adder 312 and a level judging circuit 313. The level judging circuit 313 judges the levels of respective data in the input primary color signal data Di that are in a level area below a predetermined level. An address signal generating circuit 314 receives the output signal from the level judging circuit 313 and produces and address signal corresponding to each of the levels of the respective primary color signal data which are in the predetermined level area. The address signal from the circuit 314 is supplied to a difference data table 315.

Figure 7:
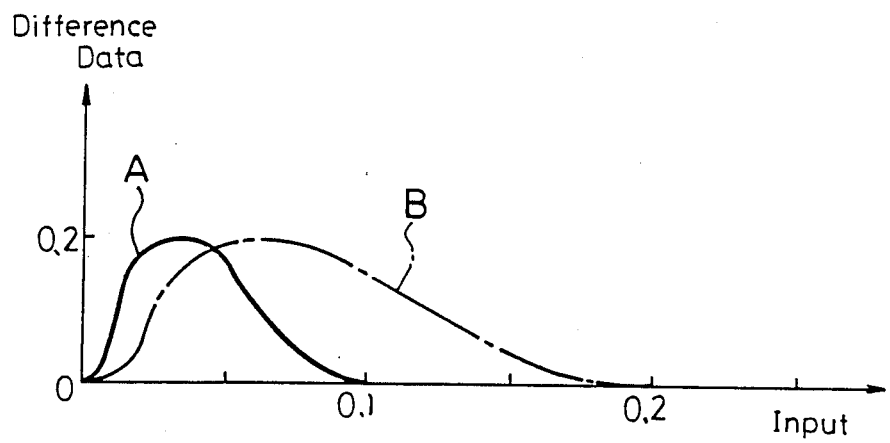
FIGS. 7 and 8 are respectively graphical representations of characteristics used to explain the operation of the gradation control circuit shown in FIG. 5.

At respective addresses of a plurality of areas of the difference data table 315, there are stored a respective difference data D corresponding to the respective levels within the low level area of the input primary color signal data as shown by a solid curve A and a one-dot-chain curve B in FIG. 7 forming a graphical representation. The difference data D is read out from the respective address area of the difference data table 315 in response to the address signal supplied thereto. The curves A and B in FIG. 7 are each presented as a sine wave of which the peak is deviated and the differential coefficients of the staring end portion and the ending end portion thereof go to zero.

A coefficient multiplier 316 is provided to multiply a variable coefficient Kv by the difference data D supplied from the difference data table 315. The variable coefficient Kv is supplied from a terminal 317 and can be within the range expressed, for example, by the inequality $-1 \leq kv \leq 1$. The output data Kv·ΔD from the coefficient multiplier 316 is added to the input primary color signal data Di by the adder 312 and then delivered to an output terminal 318.

Figure 8:
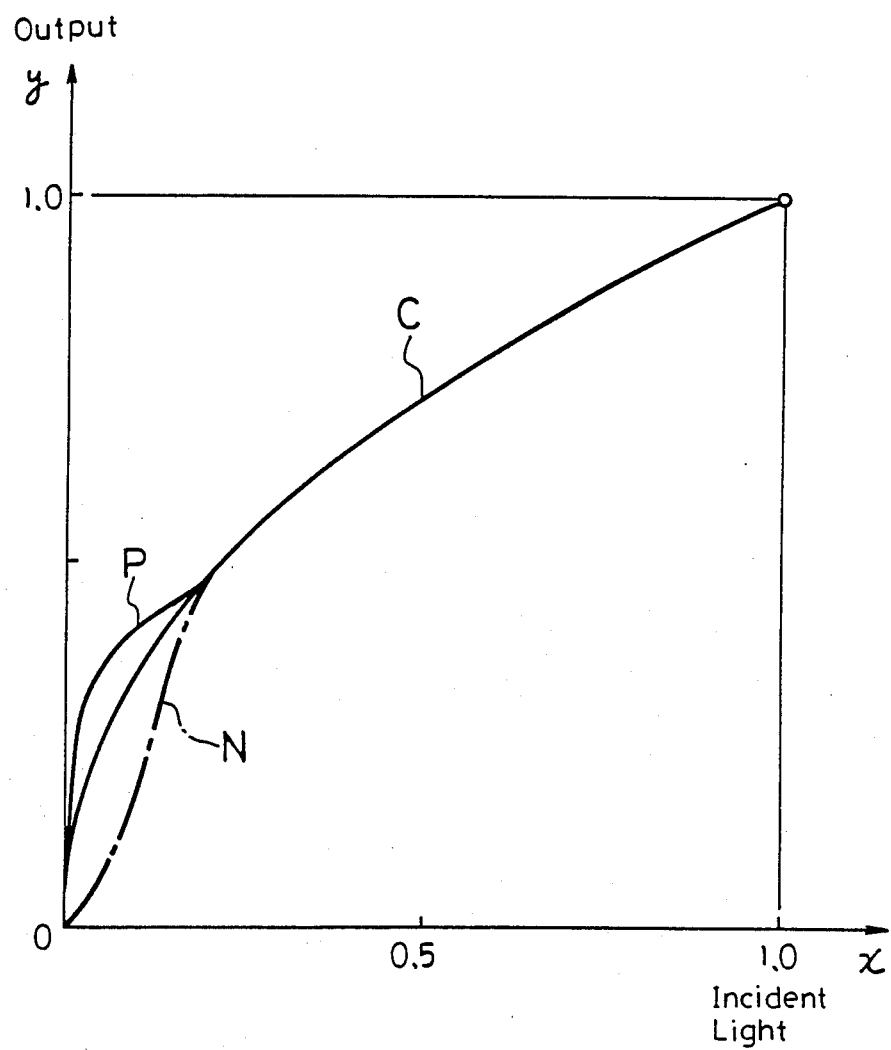

As is well known, the gamma value of the picture tube is about 2.2 so that the image pick-up tube effects the gamma correction so as to establish the relation $y - x^{1/2.2}$ where x assumes the amount of incident light and y assumes the level of the output signal as shown by a curve C in FIG. 8. This gamma correction processing is effected, for example, in the respective processor circuits 3R, 3G and 3B shown in FIG. 1.

In accordance with the above embodiment, when the variable coefficient supplied to the multiplier 316 is determined as Kv=0.5, the one-dot-chain curve B shown, for example, in FIG. 7 is added to the low level portion of the curve C in FIG. 8 to present the gradation characteristic that is presented by a solid curve P in FIG. 8. Thus, in the dark portion of the reproduced picture, for example, glittery black hair and shade can be expressed clearly.

On the other hand, if the variable coefficient is determined to establish Kv = -1, for example, the one-dot-chain curve B shown in FIG. 7 is subtracted from the low level portion of the solid curve C shown in FIG. 8 to present the gradation characteristic shown by one-dot-chain curve N in FIG. 8. Thus, in the dark portion of the reproduced picture, for example, the dark background is compressed and the foreground is emphasized.

As earlier noted, since the differential coefficients at both ends of the curves A and B representing the difference data in FIG. 7 are zero, the solid curve P and the one-dot-chain curve N in FIG. 8 can be smoothly connected to the solid curve C.

It should be understood that, although preferred embodiments of the invention have been described in detail above, many modifications and variations could be effected therein by one with ordinary skill in the art without departing from the spirit and scope of the invention as defined by the appended claims.

I claim as my invention:

1. An aperture correction circuit comprising:
   a video signal source generating first, second and third primary color signals;
   matrix circuit means receiving said first, second and third primary color signals and being responsive to a control signal for selectively matrixing said first, second and third primary color signals to produce a respective composite digital color video signal;
   aperture correction signal generating means supplied with said composite digital color video signal for generating an aperture correction signal therefrom;
   adding means for adding said aperture correction signal to each of said first, second and third primary color signals; and
   characteristic control means responsive to said control signal for controlling characteristics of said aperture correction signal generated by said aperture correction signal generating means in coordination with the selective matrixing of said first, second and third primary color signals.

2. An aperture correction circuit according to claim 1; wherein said characteristic control means includes characteristic control data sources for generating respective characteristic control data, and a selector responsive to said control signal for selecting data from at least one of said characteristic control data sources.

3. An aperture correction circuit according to claim 2; wherein said characteristic control data sources include random access memory for storing external data.

* * * * *